United States Patent [19]

Lusk et al.

[11] 4,148,008
[45] Apr. 3, 1979

[54] TIRE PRESSURE MONITORING SYSTEM

[76] Inventors: Joe F. Lusk, Box 88; William H. Rood, Box 122, both of W. Campton, N.H. 03228

[21] Appl. No.: 837,915

[22] Filed: Sep. 29, 1977

[51] Int. Cl.² ................. B60C 23/02; G08B 23/00
[52] U.S. Cl. .................... 340/58; 200/61.25; 307/116; 340/52 F; 340/521
[58] Field of Search ............... 340/58, 52 F, 646, 675, 340/676, 517, 521; 200/61.22, 61.25; 73/146.3, 146.4, 146.5; 361/65, 203; 307/99, 116, 118

[56] References Cited

U.S. PATENT DOCUMENTS

| | | | |
|---|---|---|---|
| 3,602,884 | 8/1971 | Brumbelow | 340/58 |
| 3,614,732 | 10/1971 | Lejeune | 340/58 |
| 3,662,335 | 5/1972 | Fritze | 340/58 |
| 3,665,387 | 5/1972 | Enabnit | 340/58 |
| 3,694,803 | 9/1972 | Strenglein | 340/58 |
| 3,723,966 | 3/1973 | Mueller et al. | 340/58 |
| 3,806,905 | 4/1974 | Strenglein | 340/224 |
| 3,831,161 | 8/1974 | Enabnit | 340/259 |
| 3,840,850 | 10/1974 | Whiteing et al. | 340/58 |
| 3,858,174 | 12/1974 | Harris | 340/58 |
| 3,873,965 | 3/1975 | Garcia | 340/58 |
| 3,881,170 | 4/1975 | Hosaka et al. | 340/52 F |
| 3,922,639 | 11/1975 | Shinahara et al. | 340/52 F |
| 3,930,224 | 12/1975 | Whiteing et al. | 340/58 |
| 3,975,708 | 8/1976 | Lusk et al. | 340/80 |
| 3,990,041 | 11/1976 | Blanchier | 340/58 |
| 4,067,235 | 1/1978 | Markland et al. | 73/146.5 |
| 4,072,927 | 2/1978 | O'Neil | 340/58 |
| 4,087,800 | 5/1978 | Lee | 340/676 |

Primary Examiner—John W. Caldwell, Sr.
Assistant Examiner—Joseph E. Nowicki
Attorney, Agent, or Firm—Wolf, Greenfield & Sacks

[57] ABSTRACT

A system for monitoring tire pressure preferably at each and every tire to provide an indication of low, unsafe pressure to the operator of the vehicle. The system can be used in pleasure vehicles or commercial trucks and basically comprises a sensor unit mounted to the tire rim including an actuating switch and coupling coil, and a detector unit physically unattached to the sensor unit and also including a coupling coil and associated detecting and indicating circuitry. The sensor unit rotates with the tire and rim while the detector unit, which is preferably mounted to the brake shoe, is stationary enabling inductive coupling between sensor and detector units once each revolution of the wheel of the vehicle. The sensor unit is secured to the inner surface of the rim and is compressable to operate the actuating switch. The detector unit may be powered directly from the vehicle storage battery or may tie into an existing diagnosis system of the vehicle.

12 Claims, 4 Drawing Figures

TIRE PRESSURE MONITORING SYSTEM

BACKGROUND OF THE INVENTION

The present invention relates to a system for monitoring the pressure of tires on a vehicle, particularly a commercial vehicle such as a tractor trailer. The invention is concerned with a magnetic detection technique and employs a rotating sensor unit cooperatively associated with a non-rotating detector unit.

There are a number of prior art systems for detecting the pressure condition of vehicle tires. See for example, U.S. Pat. Nos. 3,831,161; 3,614,732; 3,665,387; 3,858,174; and 3,602,884. Of these known systems there are certain disadvantages associated therewith and it is one of the objects of this invention to provide an improved system which overcomes many of these disadvantages. For example, a system of the type shown in U.S. Pat. No. 3,602,884 requires modification of the tire rim. Also, this system mounts the detection components outside of the wheel assembly and essentially unprotected. Other prior art systems are rather complicated in construction and still other systems are not readily adaptable to any existing diagnosis system presently used with the vehicle. The system of the present invention is particularly useful with a diagnosis system of the type shown in U.S. Pat. No. 3,975,708.

Accordingly, one object of the present invention is to provide an improved system for monitoring vehicle tire pressure employing an improved form of magnetic coupling detection. In accordance with the invention when tire pressure is sufficiently low, a resonant condition exists, which condition is inductively coupled to amplitude detection means.

Another object of the present invention is to provide a tire pressure monitoring system that includes a sensor unit and a detector unit physically unattached to the sensor unit and wherein both units are mounted so as to be enclosed and thus protected from dirt, grease, etc. In accordance with the invention the sensor unit is secured to the inner surface of the tire rim in the space provided between the rim and the tire itself. The detector unit is secured to the brake shoe or the inner surface of the backing plate so as to be substantially enclosed between the backing plate and the brake drum.

A further object of the present invention is to provide a tire pressure monitoring system that requires substantially no alteration of the existing wheel system of the vehicle. In accordance with the invention, rather than providing passages or the like through the rim for receiving a transducer, the sensor unit of this invention secured to the inner surface of the rim without requiring any alteration to the rim.

Still another object of the present invention is to provide an improved tire pressure monitoring system that is readily adaptable for use with an existing diagnosis system presently in the vehicle.

SUMMARY OF THE INVENTION

To accomplish the foregoing and other objects of this invention the system comprises a first unit, herein termed a sensor unit including a monitoring switch means and first inductive coupling means. The sensor unit is mounted on the tire rim in the air pressure space defined between the tire and rim and the unit is rotatable with rotation of the tire. The system also comprises a second unit, herein termed a detector unit, which is non-rotatable essentially fixed in position in the vehicle. This detector unit includes a second inductive coupling means and associated amplitude detection means. The detector unit is preferably disposed in the space defined between the brake drum and backing plate of the vehicle wheel assembly so that the detector unit is protected from any road hazards such as dirt and stones. The monitoring switch means has a normal position which in the preferred embodiment is an open position when the air pressure in the tire is above a predetermined threshhold level. When the tire pressure decreases to below this threshhold level, the monitoring switch means assumes a second fault position, which in the preferred embodiment is a closed position. The detector and sensor units are disposed in relatively close proximity to each other; that is at least once per revolution of the vehicle wheel. In this alignment position between the units the amplitude detection means senses whether the monitoring switch means is in its normal position or its fault position. In the preferred embodiment the sensor unit comprises an inductor and capacitor connected in a loop with the monitoring switch means to thereby form a tank circuit. When the monitoring switch means is opened, there is little or no inductive coupling to the inductor of the detector unit but when the monitoring switch means closes because of a fault condition, a resonance is established and the change in amplitude of this signal at the detector unit is sensed by the amplitude detection means to signal the driver of the vehicle that a low tire pressure condition exists.

In accordance with the present invention there is also provided an improved construction of the sensor unit itself. The sensor unit can be constructed quite compactly, and does not require any modification of the tire rim. In the preferred construction the sensor unit comprises an inductor and a capacitor coupled in a loop with a monitoring switch. These components are contained within a relatively rigid housing defining a space for the components and also for a compressible medium such as a synthetic gel. There is a rigid member associated with the sensor unit positioned for contact with the movable portion of the monitoring switch. This rigid member is arranged so that under no or low pressure conditions the switch is in its closed position. When pressure is applied within the tire against the exposed surface of the sensor unit, the rigid member acts upon the monitoring switch to open its contacts thereby opening the loop and establishing a steady state condition of monitoring. When the pressure in the tire decreases the rigid member relaxes and the switch is permitted to close thereby closing the loop through the inductor and capacitor. This establishes a resonant condition that is sensed by the detector unit during the cooperative alignment between the unit.

DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
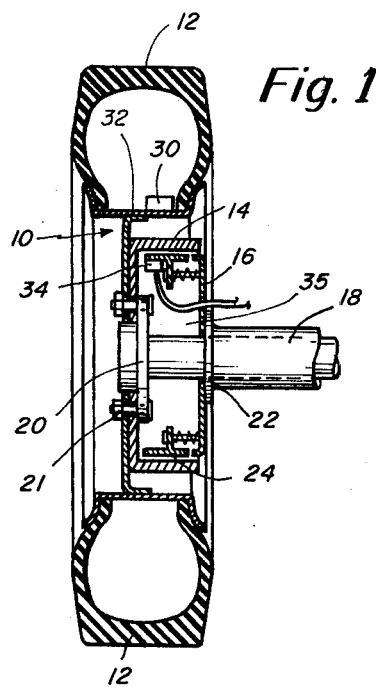
FIG. 1 is a cross-sectional view through one wheel of a vehicle showing the physical arrangement of the components of the system of this invention.

The system of the present invention is used to monitor tire pressure and preferably includes means for monitoring the pressure of each and every tire associated with the vehicle. The concepts of the present invention may be employed with any type of motor vehicle and other types of vehicles such as trailers. FIG. 1 is a cross-sectional view showing a typical wheel assembly and the arrangement of a portion of the system of this invention.

In FIG. 1 the wheel assembly includes a tire rim 10 upon which is mounted the tire 12, brake drum 14, backing plate 16, and axle housing 18. The axle itself has an end flange 20 to which the brake drum and rim are secured in a conventional manner by bolts 21. The axle housing 18 also has a flange 22 to which the backing plate 16 is secured usually by a bolting arrangement. The brake drum 14 rotates with the axle while the backing plate 16 is non-rotating. FIG. 1 also shows the brake shoe 24 which is typically operated by a wheel cylinder not shown in FIG. 1. The brake shoe 24 is partially supported from the backing plate 16.

Figure 3:
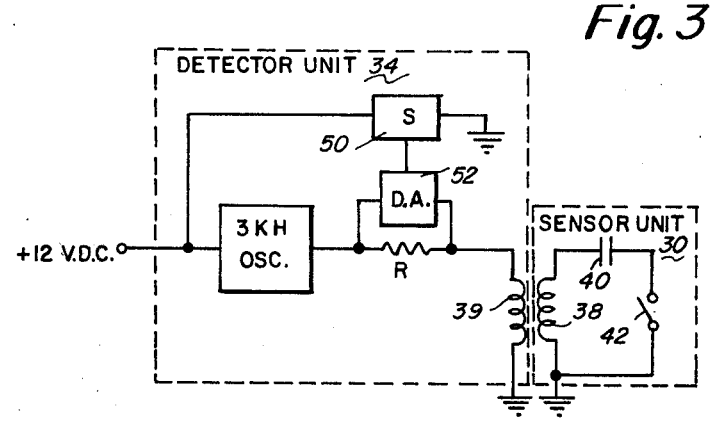
FIG. 3 is a schematic circuit diagram of one embodiment of the present invention showing the detector unit and sensor unit.
Figure 4:
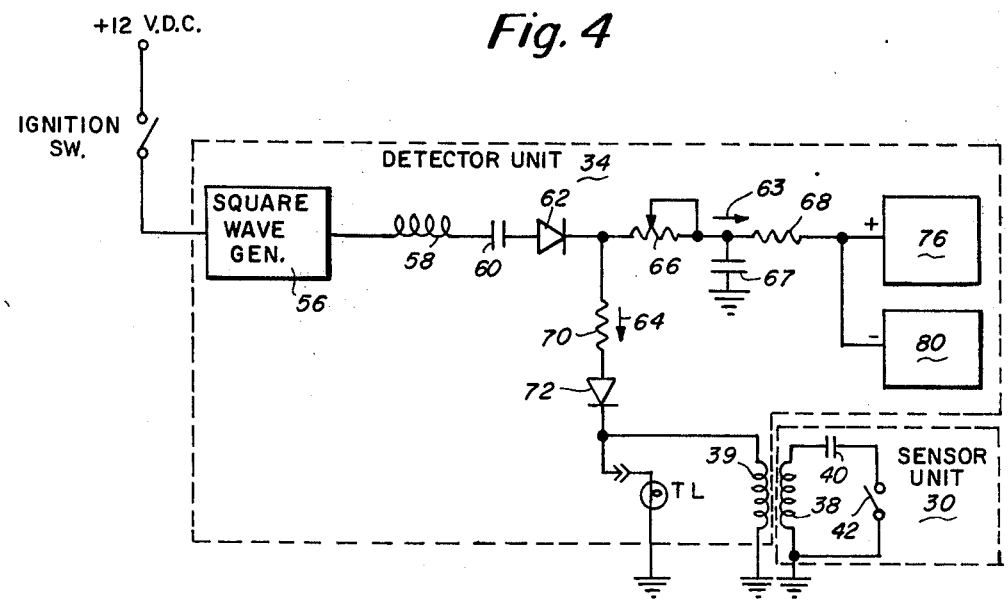
FIG. 4 is another schematic circuit diagram of an alternate embodiment of the invention as adapted for use with an existing diagnosis system of the vehicle.

FIG. 1 shows the sensor unit 30 secured to the peripheral flange 32 of the rim 10. The complimentary detector unit 34 is secured to the brake shoe 24 preferably on an inwardly facing surface thereof opposite to the surface holding the lining of the brake shoe. The spacing between the sensor unit and the detector unit is preferably no greater than 7 inches when they are in relatively radial alignment. The construction and position of the sensor unit 30 is shown in more detail and discussed hereinafter with reference to FIG. 2. Detector units are shown in FIGS. 3 and 4. The sensor unit 30 is totally contained in the space defined between the rim and the tire. The detector unit 34 is contained in the enclosed space 35 defined between the backing plate 16 and the rotating brake drum 14. In this way the detector unit 34 is protected from any outside hazards such as flying stones that would damage the detector unit if it were located outside of the space 35.

Figure 2:
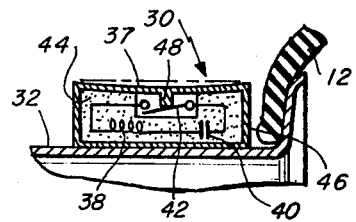
FIG. 2 is an enlarged cross-sectional view showing the detail of the sensor unit of FIG. 1.

FIG. 2 is a cross-sectional view of the sensor unit 30 shown secured to the peripheral flange 32 of the rim. In FIG. 2 the sensor unit 30 is shown in its compressed position with proper air pressure in the space between the rim and tire being impressed upon the unit primarily along the top surface 37 of the sensor unit. Electrically, as also shown in the schematic diagram of FIG. 3, the sensor unit 30 includes an inductor 38, a capacitor 40, and an actuating switch 42. These components are intercoupled in a loop which is encased in a compressible gel 44 contained within the rigid plastic housing 46. The housing 46 includes a rigid leg 48 extending toward the actuating switch 42 for operating its movable contact. In the position shown in FIG. 2 the rigid leg 48 is urged against the movable contact so that the switch is in its open position with the gel being compressed so as to permit the top wall of the housing to move toward the actuating switch 42. Without any pressure being applied to the surface 37 the rigid leg 48 moves away from the switch 42 permitting its contacts to close. The switch 42 is preferably of the type having an easily movable arm that is normally biased to the closed position.

The sensor unit 30 has no connections that extend through the flange 32, and is secured to the flange 32 in a suitable manner such as by using an epoxy glue. In order to install the sensor unit 30 the tire is, of course, broken down to permit attachment of the sensor unit to the rim.

The schematic diagram of FIG. 3 shows the sensor unit 30 which comprises the inductor 38, capacitor 40 and actuating switch 42 interconnected in a loop. When the switch 42 is in its closed position the circuit forms a tank circuit. In FIG. 3 it is noted that one side of the inductor 38 is connected to ground. This connection can be made quite easily by providing a separate conductor wire in the embodiment of FIG. 2 coupled from the inductor to the rim. Alternatively, the bottom wall of the housing 46 may be a conductive plate secured to the rim with a wire connecting from the conductive plate to the inductor 38.

FIG. 3 also shows the detector unit 34 which may be encased in a small housing and secured to the brake shoe as depicted in FIG. 1. The detector unit includes a second inductor 39 which is grounded on one side and connects on the other side to a sensing resistor R. An oscillator is provided which may be a conventional design and may be, for example, a 3 KHz oscillator. This oscillator is powered from the +12 VDC line, which is the "hot" voltage normally available in a motor vehicle. This voltage also couples to transistor switch 50. A differential amplifier 52 couples across the resistor R and senses a change in amplitude of the peak current through the resistor R. The output of the differential amplifier 52 coules to the transistor switch 50.

Under normal operating conditions, with sufficient air pressure in the tire, the switch 42 is in its open position as depicted in FIGS. 2 and 3. Under that condition the secondary inductor 38 and series connected capacitor 40 are open-circuited thus providing an infinite impedance at the secondary coil 38 reflected as an extremely high impedance to the primary circuit. The current through resistor R is thus negligible and the output from the differential amplifier 52 is insufficient to operate the transistor switch 50. The coupling condition between the inductors 38 and 39, of course, occurs only once each revolution of the tire when the two inductors are in radial alignment.

When the air pressure drops below a predetermined threshhold level, the switch 42 closes providing a closed loop circuit including the inductor 38 and the capacitor 40 which together form a tank circuit having a preselected peak resonant operating frequency preferably selected at the operating frequency of 3 KHz. When the switch 42 closes, this resonant condition exists causing an induced (reflected) low reactance in the primary coil 39 providing a bipolar ringing signal having a relatively substantial peak amplitude flowing through resistor R. This peak current or at least one polarity thereof is sensed by the differential amplifier once each revolution and as soon as the switch 42 has closed, the output from the differential amplifier is of a sufficient magnitude to cause actuation of the transistor switch 50. An alarm or indicator means may be coupled from the transistor switch 50 to sense this low tire pressure condition.

FIG. 4 shows another embodiment of the present invention used with a diagnosis system such as shown in U.S. Pat. No. 3,975,708. This prior art system employs a square wave generator such as the generator 56 shown in FIG. 4 which, in the system arrangement, couples to a number of different filter circuits for passing different frequency signals to a number of different load devices such as tail light lamps (one of which is shown in FIG. 4) for sensing and indicating the condition thereof. In the embodiment of FIG. 4 the indicating circuitry is essentially shared to detect two conditions, (1) TL lamp out, and (2) tire pressure fault.

In FIG. 4 the square wave generator 56 is shown coupling to a filter circuit comprised of inductor 58 and capacitor 60. The values of these components may be chosen to pass frequencies about 100 KHz, for example. This cyclic frequency signal is coupled through the filter circuit to the diode 62 and from there may branch to either conductor path 63 or conductor path 64 both depicted by arrows in FIG. 4. The conductor path 63 includes a potentiometer 66, a capacitor 67 and a resistor 68. The path 64 couples by way of a resistor 70 and a diode 72 to either the primary inductor 39 or lamp TL. It is noted in FIG. 4 that part of the detector unit, namely the inductor 39, and the sensor unit 30 are substantially the same as shown in FIG. 3.

The embodiment of FIG. 4 operates on substantially the same principles as the embodiment shown in FIG. 3. In FIG. 4 when the tire pressure is at the proper levels, the switch 42 is open and a primary winding 39 represents a substantially infinite impedance. Even with this high impedance, however, the current flow is predominantly down the path 64 because it is assumed that the lamp TL is operating properly. Thus, under normal operating conditions with the lamp operative and the switch 42 open, there is insufficient current flow in the path 63 to substantially charge capacitor 67. Under this condition neither of the bistable devices 76 or 80 are triggered. The bistable devices 76 and 80 may be conventional devices and may even each be a comparator having the input not shown in FIG. 4 coupled to the appropriate voltage so as to sense positive and negative voltages. The device 76 detects a positive voltage of a sufficient magnitude while the device 80 detects a negative voltage across capacitor 67 of a sufficient magnitude.

Under the normal conditions previously expressed, the capacitor 67 does not charge sufficiently to trigger either of the devices 76 or 80. A signal from the generator 56 is selected to have a duty cycle so that any charging of the capacitor 67 that occurs in a portion of the cycle is followed by a discharge portion of the cycle that never permits any appreciable total charging of the capacitor 67.

There are two fault conditions that could occur with the circuit of FIG. 4. If the tail lamp TL comes open-circuited with the inductors 39 still representing an extremely high impedance then there is virtually no current flow in the path 64. The burst of pulses from the generator 56 is thus delivered to the path 63 causing a rapid positive charging of capacitor 67. Almost immediately the device 76 is triggered and the triggering of this device is an indication of the inoperability of the lamp TL.

Under the other fault condition, the switch 42 closes because the tire pressure has been sufficiently reduced to cause this closing. Under this condition there is essentially a tank circuit formed with the inductor 38 and the capacitor 40 causing a reflected signal in the primary inductor 39 which is in the form of a damped ringing signal having both positive and negative peaks. The negative peaks are essentially passed by way of path 64 through the diode 72 causing a rapid negative charging of capacitor 67 which in turn triggers the negative-responsive device 80. The positive portion of the reflected signal was not coupled to the capacitor 67 because of the blocking provided by the presence of diode 72. Thus, there is provided in FIG. 4 a unique circuit that has a capacitor 67 that receives either positive or negative charges for operating the devices 76 and 80 depending upon a particular fault condition that has occurred.

Having described a limited number of embodiments of the present invention, it should now become apparent to those skilled in the art that numerous other embodiments and modifications thereof are contemplated as falling within the scope of this invention. For example, in the disclosed embodiment the actuating switch 42 is shown normally in an open position and is actuated to a closed position by reduced tire pressure. In an alternate embodiment the switch may be normally closed and moved to an open position for detecting low tire pressure. Also, the detector unit 34 has been shown secured to the brake shoe but also could be secured to the backing plate or even the axle housing within the space 35.

What is claimed is:

1. A condition monitoring system comprising;
    means for generating an alternating test signal,
    first means including a monitoring switch means and first inductive coupling means,
    second inductive coupling means in periodic relative alignment and with the first inductive coupling means,
    means conveying the alternating test signal to the second inductive coupling said test signal means including resistive means coupling directly to the second inductive coupling means,
    and means for sensing current flow through the second inductive coupling means coupled from the resistive means and responsive to a change in current flow through the resistive means,
    whereby the condition of said switch means is determined by the sensing of a low or negligible current when the switch means is open and a reflected higher current when the switch means is closed.

2. A system as set forth in claim 1 wherein said first means includes a capacitance means forming, with said first inductive coupling means, a tank circuit having a predetermined resonant frequency so that when the switch means is closed a reflected vibratory signal is induced in the second inductive coupling means detected by the means for sensing.

3. A system as set forth in claim 2 wherein said means for sensing includes means for sensing an amplitude change in the current flow to said second inductive coupling means.

4. A system as set forth in claim 3 wherein said means conveying the test signal defines a first path coupling to said second inductive coupling means and said means for sensing is defined at least in part by a second path including a charging capacitor and at least one polarity detector.

5. A system as set forth in claim 4 including a load device coupled to the first path so that the test signal may couple to both the load device and the second inductive coupling means, said capacitor being charged to one polarity upon failure of the load device and to an opposite polarity upon closure of said switch means, further including opposite polarity detectors for sensing the opposite charged condition of said capacitor.

6. A system as set forth in claim 1 wherein the test signal is an interrogation signal.

7. A system as set forth in claim 1 wherein the first and second inductive coupling means comprise a transformer means having only first and second inductors in voltage inducing relative relationship.

8. A system as set forth in claim 7 wherein the resistive means comprises a resistor and the sensing means detects changes in the magnitude of current flow through the resistor.

9. A system as set forth in claim 8 wherein the sensing means comprises a differential amplifier having its inputs coupled directly across the resistor.

10. A system as set forth in claim 8 wherein the means for conveying the test signal defines a first path, and further including a second path to the sensing means, said first and second paths conductively joining at said resistor and said sensing means including a level detector.

11. A condition monitoring system comprising;
means for generating an alternating test signal,
first means including a monitoring switch means, first inductive coupling means, and a capacitance means forming a tank circuit when said switch means is closed, having a predetermined resonant frequency,
second inductive coupling means in periodic relative alignment with the first inductive coupling means,
a load device,
means defining a first path for conveying the alternating test signal to both the load device and the second inductive coupling means,
means defining a second path having a charging circuit and opposite polarity detectors for sensing the opposite charge condition of the charging circuit,
said charging circuit being charged to one polarity upon failure of the load device and to an opposite polarity upon operation of said switch means.

12. A system as set forth in claim 11 including unilateral conducting means in the first path for passing only the opposite polarity signals.

* * * * *